United States Patent Office 3,202,231
Patented Aug. 24, 1965

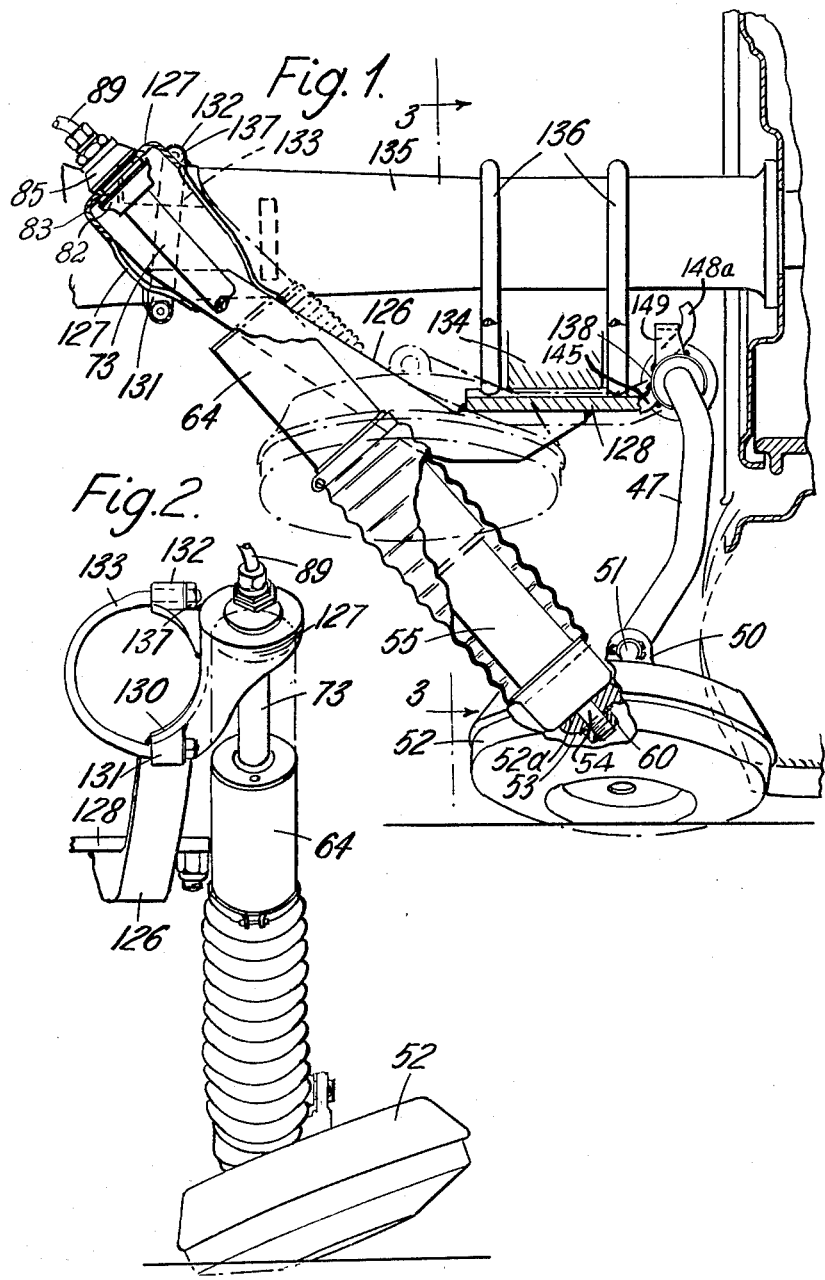

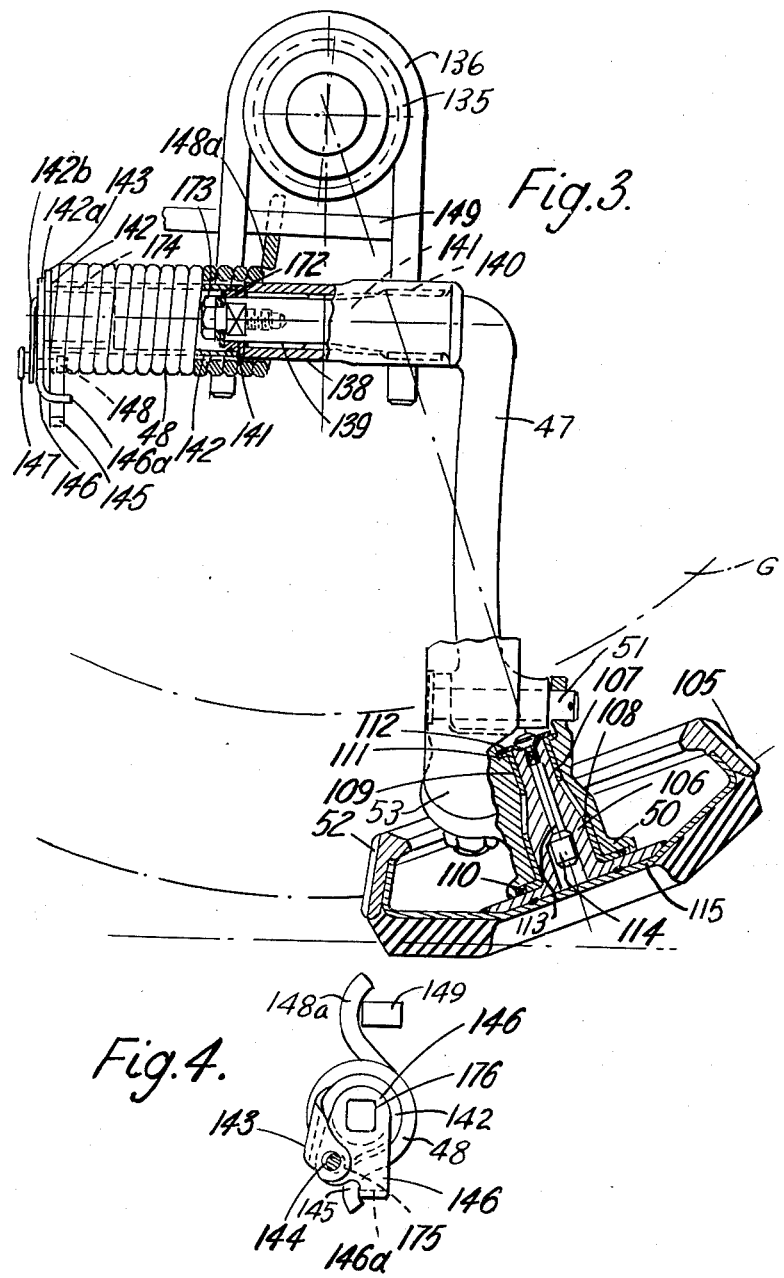

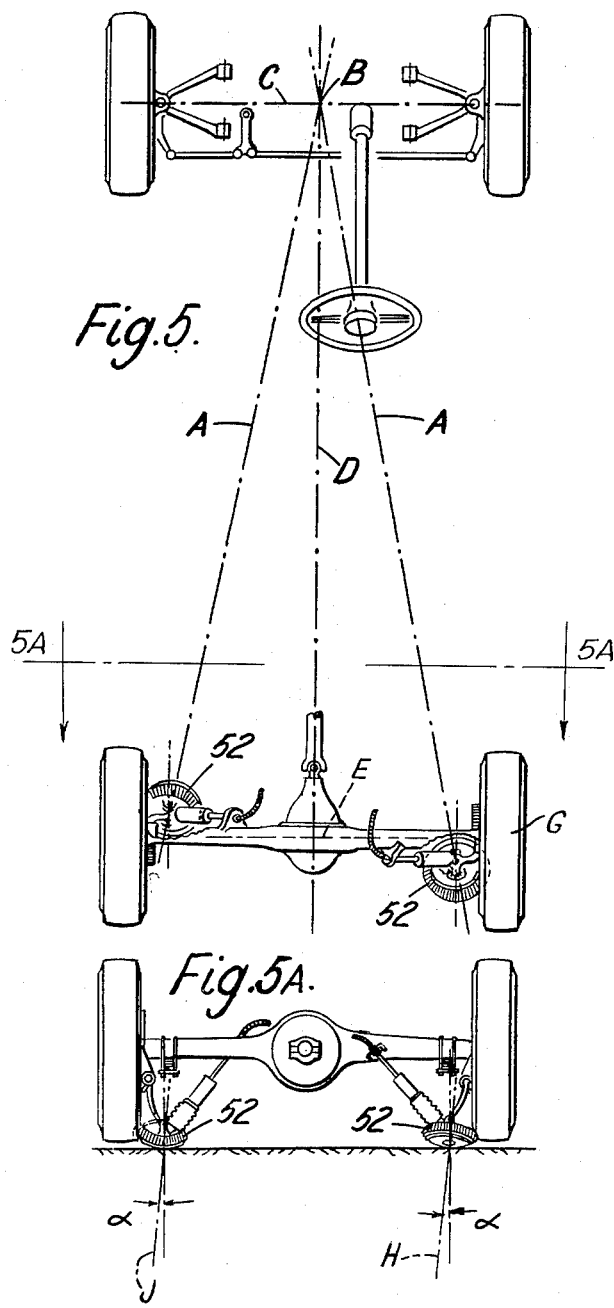

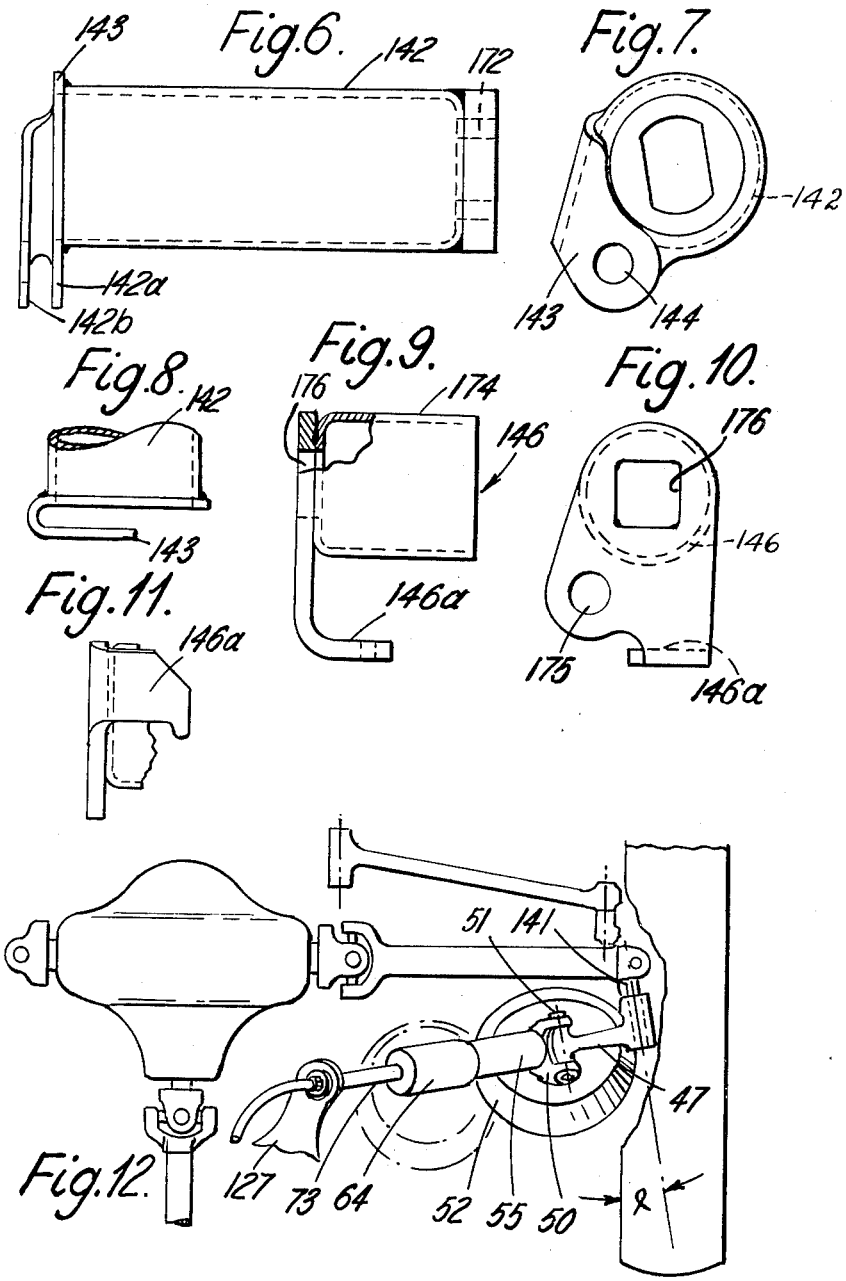

3,202,231
PARKING APPARATUS FOR MOTOR VEHICLES
Archibald James Butterworth, 7 Grove Gardens, Frimley, near Aldershot, Hampshire, England
Filed Dec. 6, 1961, Ser. No. 157,430
Claims priority, application Great Britain,
Dec. 7, 1960, 42,051/60
1 Claim. (Cl. 180—1)

This invention relates to parking apparatus for motor vehicles which apparatus is of the kind in which rollers on opposite sides of the vehicle near one end thereof are lowered by jacks into contact with the ground so as to raise both road wheels at that end of the vehicle from the ground and which rollers are driven by the raised road wheels, the shape of which rollers and their axes of rotation are so chosen that when driven from the road wheels the rollers roll along a path transverse to the longitudinal axis of the vehicle and thus slew the raised end of the vehicle sideways. This enables a vehicle to be driven in an inclined direction with respect to the side of the road into a gap between two vehicles whereupon the rollers are lowered into engagement with the ground and driven by the raised road wheels so that the vehicle is brought substantially parallel with the side of the road. Unless the axes of rotation of the rollers are particularly disposed when the rollers have engaged the ground and raised the vehicle, the rollers will suffer considerable wear and there may be excessive rolling resistance and their life will be short. An object of the present invention is to avoid this wear and reduce the rolling resistance.

According to this invention a parking apparatus of the kind referred to is characterised that the mounting for the rollers on said jacks and the mounting for the jacks on the vehicle locate the axes of rotation of the rollers, when in contact with the ground and in a condition to be driven, so that one of their axes of rotation extends upwardly, rearwardly and outwardly and the other extends upwardly, forwardly, and inwardly which axes lie in vertical planes which converge as they extend forwardly and intersect at or near the centre of a line joining the centres of the wheels at the other end of the vehicle.

The upwardly, rearwardly and outwardly extending axis of rotation applies to the roller driving the nearside wheel of a vehicle which according to the laws of a country requires the vehicle to be driven on the left hand side of the road and would apply to a roller driving the opposite wheel where a vehicle requires to be driven on the right hand side of the road.

The aforesaid vertical planes may intersect in front of said line and in the central fore and aft vertical plane of the vehicle.

In one arrangement the axes of rotation of the rollers as viewed from the side of the vehicle are oppositely inclined to a transverse vertical plane at an angle of about 20° and as viewed in a fore and aft direction both are inclined in the same sense at about 3° to the vertical.

The disposal of each roller should be such that a line passing through the point where its axis of rotation intersects the ground and through the centre of area of contact of the roller's tread with ground passes close to the centre of a line joining the centres of the wheels at the other end of the vehicle as viewed in plan.

Preferably the rollers each receive a drive from a vehicle wheel by direct contact therewith and when in contact the axis of rotation is disposed in the manner set out above.

Mountings for the rollers may be fixed to the lower ends of jacks the upper ends of which are pivotally connected to a part of the vehicle to swing sideways and in and up and down direction and said mountings are pivotally connected by links to other parts of the vehicle.

The axes of swing may be substantially horizontal and as viewed in plan may be parallel to or inclined to the fore and aft axis of the vehicle.

The expansion of each said jack may be arranged to be against the action of spring means which are provided with means for initially preloading them.

Each said link which connects the roller mounting to a part of the vehicle may be provided with a spindle which extends through bearings on a part of the vehicle and an extension of said spindle may be encircled by a helical spring, one end of which engages a part of the vehicle and the other end is engaged by a part which is rotatably mounted on said extension so as to adjust said loading of the spring and means are provided for securing said part to the extension after said preloading.

The upper end of each said jack may be provided with a mounting which is clamped to an axle casing inwardly from an anchorage plate for the vehicle spring on said axle casing and the aforesaid links may be pivotally connected to the anchorage plates or parts fixed thereto.

A bracing member may extend from that part of the jack mounting which is clamped to the axle to said anchorage plate for said spring.

The following is a description of a number of embodiments of the parking apparatus according to this invention reference being made to the accompanying drawings in which:

FIGURE 1 is an end view of a part of a rear axle of the vehicle looking from the front and showing the jack in an extended condition;

FIGURE 2 is a view of the arrangement of FIGURE 1 looking from the left of that figure;

FIGURE 3 is a section on the line 3—3 of FIGURE 1 looking in the direction of the arrows and showing the link mounting;

FIGURE 4 is an end elevation of the spring adjusting means of FIGURE 3;

FIGURE 5 and FIGURE 5A are diagrammatic views illustrating the dispostion of the axes of rotation of the rollers the former being a plan view and the other an elevation looking rearwardly from the front of the rear axle;

FIGURE 6 is an elevation of the support for the spring which swings the jack upwardly;

FIGURE 7 is a view looking from the left of FIGURE 6;

FIGURE 8 is a plan view of one end of the spring support;

FIGURE 9 is an elevation of the spring adjusting piece;

FIGURE 10 is an end elevation looking from the left of FIGURE 9;

FIGURE 11 is an under plan of the lug on the spring adjusting piece;

FIGURE 12 is a plan view of an alternative mounting for the ram and link;

Figure 13:
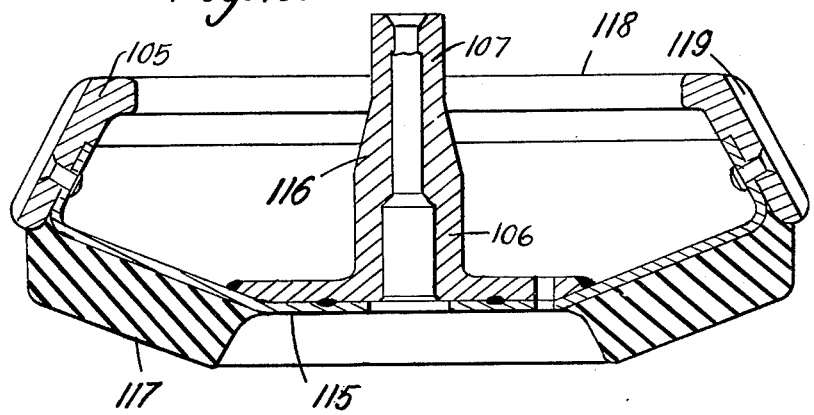
FIGURE 13 is a section through one of the rollers omitting the bearing.

The parking apparatus embodies a two stage expanding and contracting hydraulic ram comprising a comparatively large cylinder part 64, having a cylinder head at the upper end through which extends a tubular piston rod 73. Hydraulic fluid is fed from an inlet pipe 89 into the tubular piston rod. The lower end of the cylinder part 64 has sliding in it a tubular piston 55. This latter part is fixed to a base casting 53 having a bearing 108 in which the spindle 106 of a road engaging roller 52 is rotatably supported. The mounting has pivotally connected to it by a pin 51 the lower end of a link 47, the upper end of which is formed with a spindle 141 (FIGURE 3) mounted in bearings 139, 140 in a tubular mounting 138.

This tubular mounting is welded to an extension of a supporting plate 128 for the vehicle springs 134 which plate is clamped by U-bolts 136 to the back axle 135.

The smallest ram part 73 is secured by a universal joint 82, 83, 85 to a pressing 127 also fixed to the back axle. The pressing 127 is joined, by a bridge piece 126, to the spring plate 128.

The bridge piece 126 may be a tube of square or other convenient section, or it may be a pressing. It may be attached to the other components at its ends by welding, as shown. Pressing 127 has an arcuate inner face 130 shaped to mate with the profile of the axle tube at that point. It also carries lugs 131 and 132, through which may be passed the ends of U-bolts 133. It will be seen that this assembly may readily be attached to a motor vehicle axle simply by removing the nuts which hold road spring 134 to axle 135 by means of the U-bolts 136. The special spring-plate 128 which forms part of the bracket is then passed over the ends to U-bolts 136, and the nuts are refitted. Before tightening these nuts fully, the pressing 127 is swung into contact with the axe tube and U-bolt 133 is fitted and secured by nuts 137.

As indicated above, the tubular mounting 138 carries bearings 139 and 140 in which the spindle 141 of the link 47 is mounted. The tubular mounting 138 is of such a length (see FIGURE 3) that the end of the link spindle 141 protrudes from it. This link spindle has flats formed upon it which are engaged by a suitably shaped hole in a plate 172 fixed to one end of spring support 142 (FIGURES 3 and 6). The plate is retained in position by a screw 173 which passes through a hole in it and engages a threaded hole in the spindle 141. This component is generally tubular, and has welded to it at its outer end a sheet-metal piece 143 which is folded back on itself and drilled with holes 144 shown in FIGURE 4. A retraction spring 48 encircles the spring support 142 with one end 148a engaging an anchorage 149 welded to the tubular mounting 138, and with its first one or two coils encircling the end of the tubular mounting 138. The remaining length of retraction spring 48 lies around the spring support 142 and its outer extremity 145 is engaged by spring setting piece 146. Various views of spring support tube 142 and spring setting piece are also shown separately in FIGURES 6 to 11. The spring setting piece 146 consists of a short tubular portion 174 attached to a sheet-metal piece formed with a hole 175 corresponding to the hole 144 in spring support sheet metal piece 143, and a lug 146a which is bent back in such a way that it can engage the extremity 145 of the retraction spring 48. After retraction spring 48 has been loosely assembled on spring support 142, the spring setting piece 146 may be entered into the outer end of spring support 142, and the sheet-metal part aligned with the gap between the folded parts 142a and 142b (FIGURE 6) of end-plate 143. A square hole 176 may be formed in the sheet metal portion of the spring setting piece 146, and a suitable tool being inserted in this square hole, torque may be applied to wind up the retraction spring 48 and provide it with its necessary initial deflection. When the necessary angle of deflection has been applied, the hole 175 in spring setting piece 146 will coincide with the holes 144 in the spring support tube. A spring setting pin 147 may then be inserted through the three holes thus aligned, and the spanner or tool used to apply the torque may be removed. The spring setting pin has a collar by which it can be handled, a reduced central portion, and a slightly enlarged end portion, so that when this slightly enlarged end portion 148 has been passed through the three aligned holes in support tube 142, and setting piece 146, and the spanner torque removed, the holes will move slightly out of line and will then grip the setting pin 147. The enlarged portion 148 will then prevent accidental withdrawal or loss of setting pin 147. The degree to which the holes in the spring support tube and the spring setting piece move out of line must be taken into account in designing these components, so that the correct initial deflection is finally applied to the spring 48.

Also, FIGURE 3 shows the tilted attitude of roller 52, which enables it to impart sideways motion to the vehicle. It will be seen that the axis rotation of the roller 52 intersects the centre line E (FIGURE 5) of the road wheel 6 and such intersection, or approximate intersection, is desirable in the interests of a slip-free friction drive from tire to driving track 105 of roller 52. Bearing journals 106 and 107 of roller 52 are supported in bushes 108 and 109 which are pressed into base casting 50. Base casting 50 also carries a recess outside the flange of bearing 108, wherein lies an oil seal ring 110. A similar oil seal ring 111 is employed at the upper end of journal 107, and a plate 112 bears both on the upper flange face of bush 109 and on this latter oil seal. Plate 112 is retained in position by bolt and nut 113 and 114, thus retaining roller 52 in position.

The attitude that the rollers 52 assume when in engagement with the ground and with the raised vehicle wheels is a most important consideration since on this the wear of the rollers depends. Their axes of rotation should extend in an up and down direction and when viewed from the side of the vehicle they should be oppositely inclined with respect to a vertical transverse plane, say at an angle of about 20°, in order that they may both contribute simultaneously to swinging the raised end of the vehicle in the same direction. Thus the axis of rotation of one of the rollers is inclined rearwardly as it extends upwardly and this will be the roller for driving the near side wheel for vehicles driven on the left-hand side of the road, whereas the axis of rotation of the other roller is inclined forwardly as it extends upwardly.

If the inclined axes of rotation of the rollers were arranged in vertical fore and aft planes there would be a tendency for the rollers to roll sideways on parallel paths at right-angles to the fore and aft axis of the vehicle. This motion would be correct if the whole vehicle were caused to travel sideways, but as no sideways movement is applied to the front end of the vehicle, the vehicle tends to rotate about a point located near the centre of the front axle. As a result, with roller axes in vertical fore and aft planes, the rollers will be forced out of their natural path of action with resulting scrub and resistance to free rolling. This difficulty is overcome by the present invention by arranging for the path of the rolling of the rollers to follow a curved path centered upon a point near the centre of the vehicle's front axle. A convenient way of achieving this effect is so to arrange the mounting for the roller, whose axis of rotation is inclined rearwardly as it extends upwardly, that it is also inclined outwardly when viewed in a fore and aft direction along a centrally disposed line with respect to the vehicle, by a small angle α (3° in the example shown in FIGURE 1), whereas the axis of rotation of the other roller in addition to being inclined forwardly as it extends upwardly is also inclined inwardly when viewed in a fore and aft direction along a centrally disposed line with respect to the vehicle. Thus in effect the axes of the two rollers when in engagement with the road and with the vehicle wheels, when viewed in the direction of a fore and aft axis, are parallel with one another. This angle of inclination of the axis of rotation of each roller may be obtained by suitably adjusting the angle between the axis of the ram and the face 52a of base casting 53, to which the bottom ram cylinder 55 is fixed by the screw 54 and nut 60. A suitable angle at which to tilt the roller in this sense is one which causes the prolongation of the axis of rotation of the roller at the point where it strikes the ground to intersect a line drawn along the ground from the centre of the area of contact of the roller tread with the ground to a point underneath the front axle of the vehicle. In other words, the axis of each roller when viewed in plan as in FIGURE 5, must be in the same vertical plane A as a line drawn from the centre of the area of the contact of the roller tread with the ground to a point B near the centre of the front axle of the vehicle. It is not essential that these planes containing the axes of rotation of the rollers should intersect precisely at the centre of the vehicle's front axle, and for convenience a point may be chosen somewhat in front of a line C joining the front wheel centres, but lying along the fore and aft centre line D of the vehicle.

It will be appreciated that owing to the rollers being tilted in opposite directions, as viewed transversely, they both require to be tilted in the same sense when viewed in a fore and aft direction to produce the above effect.

In the arrangements described with reference to FIGURE 3 and FIGURE 12, the axis of pivoting of the upper end of the link 47 may be arranged to be transverse to the rear wheel axle as shown in FIGURE 3 and at right angles thereto. However, it may be convenient for this axis to be inclined to that direction, as shown in FIGURE 12 of the assemblage as applied to an independently sprung rear wheel of the vehicle. In this case, the pivoted upper end of the ram will require to be attached to a part 127 of the vehicle disposed away from the differential, conveniently to an unsprung part of the vehicle other than the wheel axle or to a sprung part of the vehicle. By these means it will be possible for the rollers and rams during their contracting and extending movements to be brought clear of parts of the vehicle which may be in their way.

FIGURE 13 shows a preferred form of roller, wherein a pressing 115 is welded to a roller spindle 116 and has bonded to it a tread 117, which may be of rubber or other elastic material. Driving track 105 is riveted or otherwise secured to the pressing 115, and carries on its conical outer periphery flutes or other discontinuities 119 to assist in providing a slip-free friction drive against the tire under all conditions of weather or surface.

Figure 15:
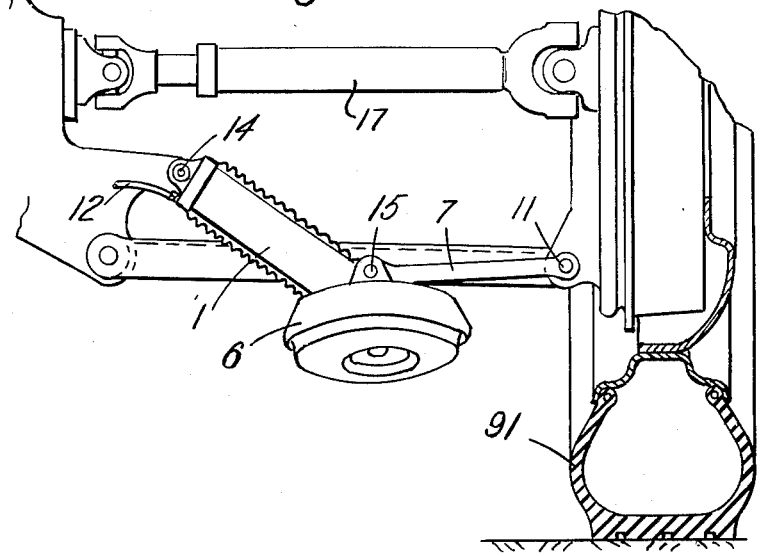
FIGURES 14 and 15 show an alternative form of mounting for the ram and link looking from the front of the back axle and at the near side wheel, the ram being extended in FIGURE 14 and contracted in FIGURE 15.
Figure 14:
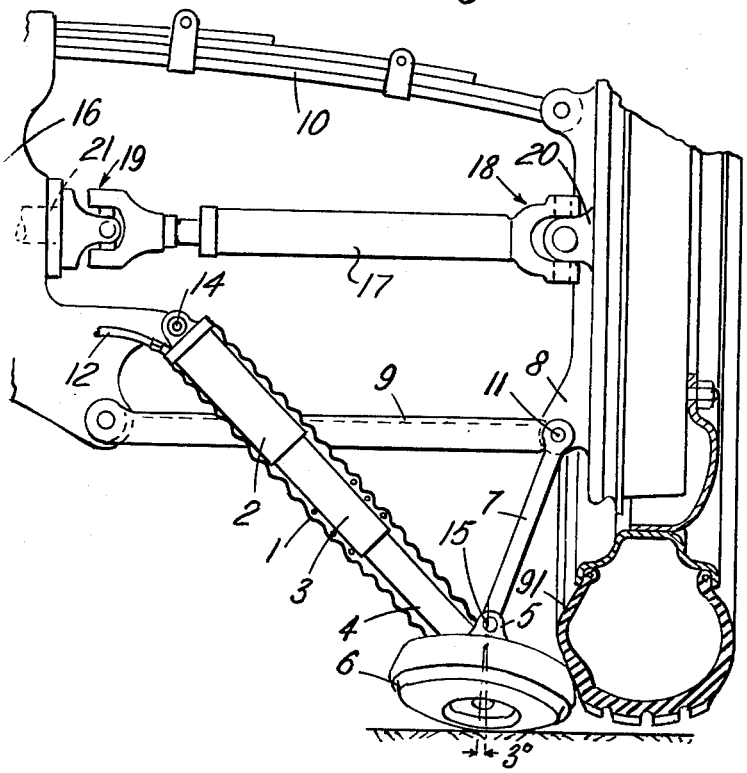

In the above description both the ram and the link are pivoted to parts secured to a wheel axle, i.e., both are to a sprung part in the case where the rear wheels are independently sprung. However, as is shown in FIGURES 14 and 15, the ram 1 may be pivotally connected to a bracket 14 formed on the differential casing (i.e., the ram may be pivoted to a sprung part 16) whereas the link 7 is pivotally connected at 11 to the mounting 8 for the wheel, i.e., to an unsprung part; which mounting has pivotally connected to it the member 9 and spring 10 both of which are anchored to the differential casing. The link 7 is also pivotally connected at 15 to the mounting 5 for the ground engaging roller 6. The wheel 91 is driven in conventional manner by a shaft 17 connected by universal joints 18, 19 at its ends respectively with wheel shaft 20 and output shaft 21 of the differential. Fluid under pressure may be supplied to the ram through supply pipe 12.

As described earlier in the specification the various parts 2, 3 and 4 of the ram are enclosed in a spring gaiter 1 and the lower ram part is so fixed the mounting 5 for the roller 6 that when the roller is in engagement with the ground and with the wheel 91, the axis of rotation H of one roller as viewed in a direction from the front to the rear of the vehicle, extends upwardly and outwardly at an angle of about 3° to the vertical whereas the axis of rotation J of the other roller when viewed in the same direction extends upwardly and inwardly at the same angle. When viewed from the side of the vehicle the axes of rotation H, J of the two rollers are inclined in opposite directions to a transverse vertical plane at angles of about 20° whereas vertical planes A, A containing the axes of rotation H, J converge as they extend forwardly and intersect one another in a fore and aft central vertical plane D and slightly forward of the front axle of the vehicle.

I claim:

A parking apparatus for a motor road vehicle comprising two jacks disposed on opposite sides of the vehicle adjacent two of its road wheels respectively, a connection between a part of each jack and the vehicle, a ground-engaging roller associated with each jack, a mounting securing said roller to another part of the jack which is relatively extensible and contractible with respect to the first part, so that when said parts of the two jacks are extended the rollers engage the ground and lift the road wheels therefrom and the rollers come into driving engagement with the road wheels and which mountings, when the rollers are in engagement with the ground, locate the axes of rotation of the rollers in two vertical planes respectively which converge and intersect one another in a vertical line of intersection that intersects a centrally disposed fore-and-aft extending line at a point of intersection closely adjacent the axis of the other two vehicle wheels, one of said axes of the rollers extending upwardly rearwardly outwardly and the other of the axes of the rollers extending upwardly forwardly inwardly, said rollers being on opposite sides of the vertical plane that includes the axes of the adjacent wheels, links pivotally mounting the rollers on the vehicle for vertical swinging movement about axes spaced from the jacks, each link having a spindle, bearings on the vehicle through which the spindles extend, each spindle having an extension, a helical spring encircling the extension, one end of the helical spring engaging a part of the vehicle, a part mounted for rotation on and relative to the extension, the other end of the spring engaging said part, and means for releasably securing said part to the extension in a rotated position of the part thereby to permit adjustment of the loading of the spring.

References Cited by the Examiner

UNITED STATES PATENTS

| | | | |
|---|---|---|---|
| 1,884,932 | 10/32 | Walker | 180—1 |
| 1,928,946 | 10/33 | Moffat | 180—1 |
| 2,964,118 | 12/60 | Butterworth | 180—1 |
| 3,073,408 | 1/63 | Winkler | 180—1 |
| 3,120,398 | 2/64 | Butterworth | 180—1 |

BENJAMIN HERSH, *Primary Examiner.*

A. HARRY LEVY, LEO FRIAGLIA, *Examiners.*